United States Patent Office 2,987,881
Patented June 13, 1961

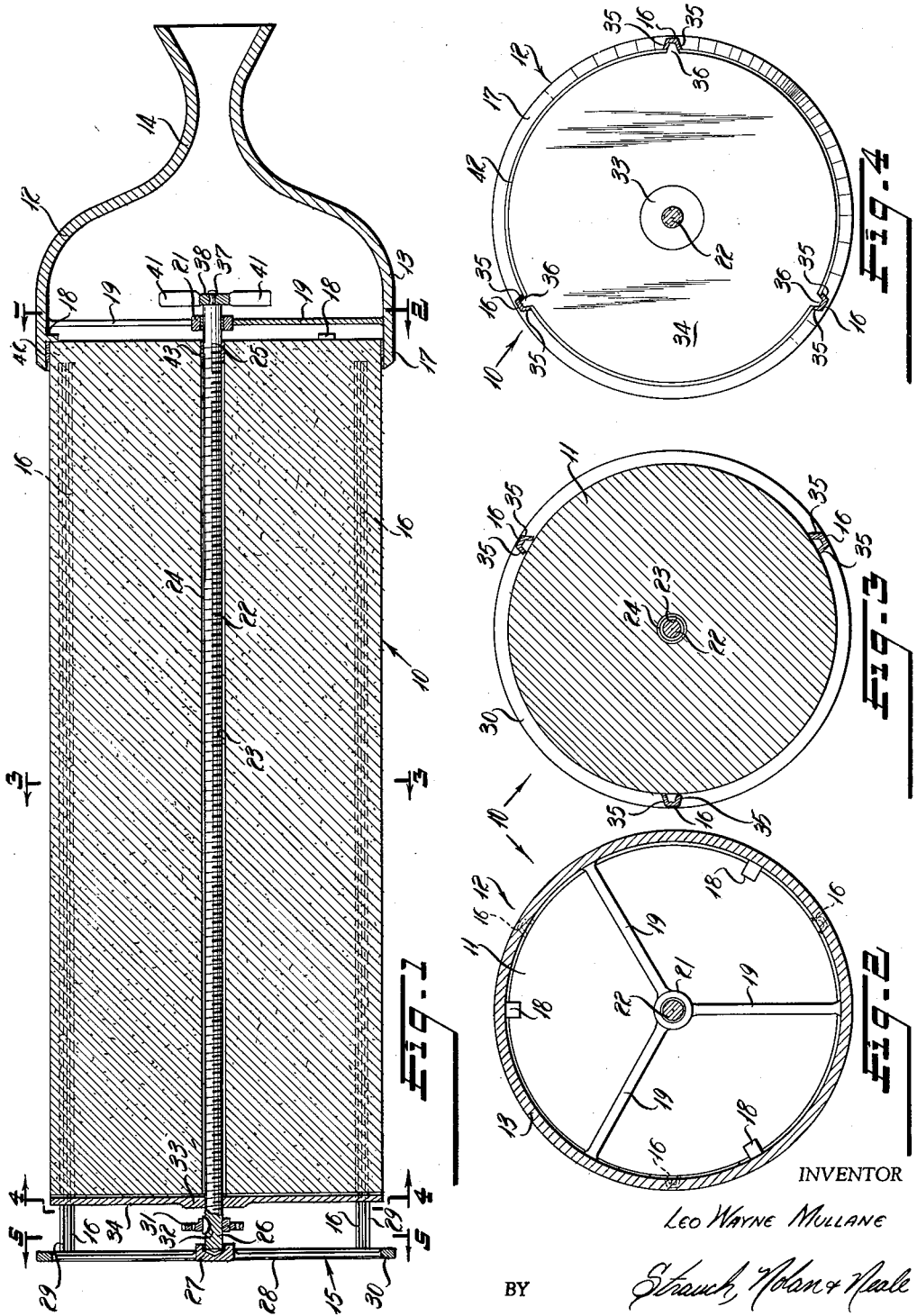

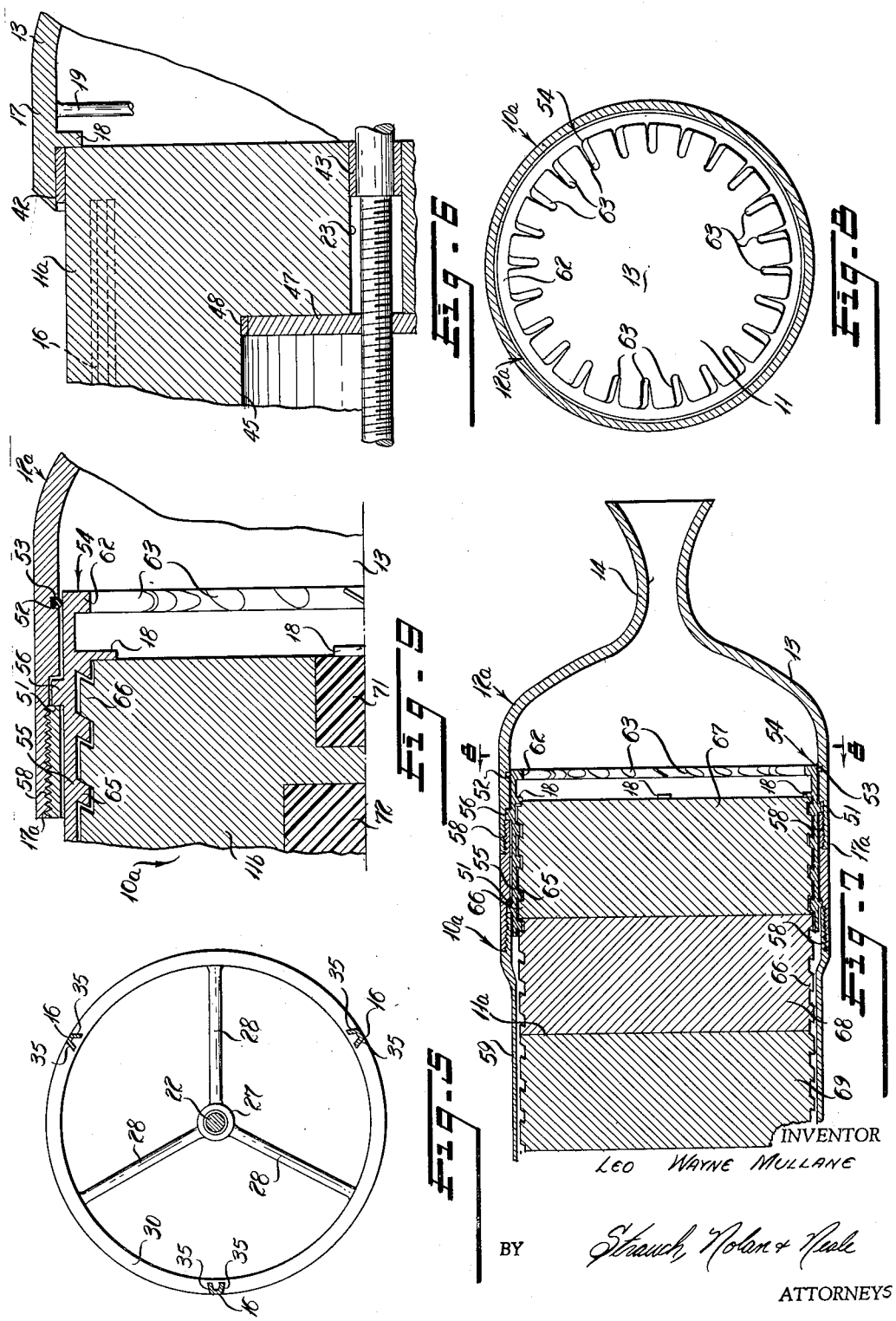

2,987,881
SOLID PROPELLANT POWER PLANT AND FUEL FEED METHOD
Leo Wayne Mullane, 1508 Avolencia, Fullerton, Calif.
Filed Apr. 29, 1958, Ser. No. 731,717
14 Claims. (Cl. 60—35.6)

The present invention relates to solid propellant power plants and more particularly to a new type of solid propellant power plant providing a constant volume combustion chamber and a novel solid propellant feed method and mechanism operable in accord with the rate of combustion of the propellant grain.

While solid propellant power plants or engines are not new in themselves, those heretofore proposed have had a relatively low propellant-weight ratio, and a variable volume combustion chamber due to the basic concept commonly adhered to of using a thick pressure resisting casing to provide a combined propellant and combustion chamber housing. Such combined housing structures or chambers have been designed to completely house the entire solid propellant grain or grains in a single chamber a portion of which forms the combustion chamber. Thus this housing or container must be built with a wall thickness sufficient throughout its entirety to withstand the full operating pressures generated by the burning propellant in the combustion chamber section. In such prior structures, the consumption of the propellant progressively decreases the volume of the remaining propellant resulting in a proportional progressive increase of the free space forming the combustion chamber area. It follows, therefore, that the effective volume of the combustion chamber increases continuously from the time of ignition until final burn out. With this ever changing combustion chamber volume, it is impractical, if not impossible, to maintain a constant pressure on the burning surface of the propellant with the result that maximum burning efficiency from ignition until final burn out cannot be provided, effective shut off of the engine after a desired interval of operation is not readily obtainable, multiple computations of the burning rate for varying combustion chamber pressure conditions are necessary to predetermine the developed speed, thrust and length of operation of such engines and an engine design providing for definitely predictable varying thrust characteristics to meet a need in use requiring a predeterminable operating speed or thrust variation, for example to vary or maintain constant flight speeds of a rocket in flight is not readily achievable.

It, accordingly, is a primary object of this invention to provide a solid propellant engine of improved propellant-weight ratio.

It is a further important object of this invention to provide a solid propellant engine having a constant volume combustion chamber thereby assuring an engine construction designed to operate at accurately predictable combustion pressures throughout the period from ignition to final burn out.

Another important object of this invention is to provide a solid propellant engine having a pressure resisting envelope or housing of minimum size and weight whereby an increase in the pressure resistant characteristics of such an engine to accommodate higher operating pressures and higher burning rates and secure an increased overall engine efficiency is possible.

A further object of this invention resides in a novel method of feeding solid propellants in devices such as rocket engines, auxiliary powerplants, starters, gas generators and chemical reactors consisting in moving the propellant grain in a manner to maintain the burning surface of an end-burning or similar propellant grain in essentially the same position relative to the mechanism's combustion chamber and exhaust nozzle.

Still another object of this invention is to provide a solid propellant power plant of general utility with a minimum volume combustion chamber designed to eliminate the need of a propellant housing and constructed to withstand the engine operating pressures and heat thereby effecting a significant reduction of overall power plant weight and a resulting significantly improved propellant-weight ratio.

A further object of this invention is to provide a solid propellant power plant capable of more efficiently utilizing end-burning types of propellant grains which are cheaper and simpler to produce and have better temperature cycling and handling properties.

Another object of the present invention is to provide a solid propellant power plant the over-all volume of which is reduced by obviating the need for the gas exit passages presently required in conventional internal burning grain engines.

Still another object of this invention resides in the provision of a solid propellant power plant having a reduced volume combustion chamber permitting the use of higher operating pressures and thereby effecting an increase in the efficiency of the over-all system and increasing burning rates.

A further object of the present invention is to provide a solid propellant power plant with means for stopping the engine's operation at any desired time prior to the end of burn-out.

Another object of the present invention is to provide a solid propellant power plant with means providing an auxiliary power take-off.

Further objects will appear from the following description when read in conjunction with the appended claims and accompanying drawings where:

FIGURE 1 is a longitudinal sectional view through a preferred form of solid propellant power plant produced in accord with the present invention;

FIGURE 2 is a transverse sectional view through the preferred form of power plant of FIGURE 1 taken substantially on line 2—2 and viewed in the direction of the arrows;

FIGURE 3 is a transverse sectional view through the preferred form of power plant of FIGURE 1 taken substantially on line 3—3 and viewed in the direction of the arrows;

FIGURE 4 is a transverse sectional view through the preferred form of power plant of FIGURE 1 taken substantially on line 4—4 and viewed in the direction of the arrows;

FIGURE 5 is a transverse sectional view through the preferred form of power plant of FIGURE 1 taken substantially on line 5—5 and viewed in the direction of the arrows;

FIGURE 6 is a fragmental quarter sectional view of the preferred form of power plant of FIGURE 1 equipped with a "plugged" propellant grain adapted to impart a reduced thrust after a predetermined time increment of operation of the power plant;

FIGURE 7 is a fragmental longitudinal sectional view of a further form of solid propellant power plant produced in accord with the present invention and illustrating a preferred variable thrust propellant;

FIGURE 8 is a transverse sectional view through the power plant of FIGURE 7 taken substantially on line 8—8 and viewed in the direction of the arrows; and FIGURE 9 is a fragmental quarter sectional view of the power plant of FIGURE 7.

The power plant of the present invention will be described in connection with the foregoing drawings wherein similar parts are designated throughout by the same reference numeral. The basic principle of the present invention consists in an arrangement of the solid propellant whereby the energy derived from the propellant gases in the combustion chamber is utilized to move the propellant grain to maintain the grain's burning surface at the same position in the combustion chamber relative to the exhaust nozzle. Devices which will effectively and practically accomplish this principle are shown in the accompanying drawings. The basic elements of these illustrated power plants can be included in any of the types of mechanism mentioned in the foregoing objects. Numeral 10 designates generally a power plant constructed in accord with this invention and particularly useful as a solid propellant rocket engine.

Power plant 10 of the preferred form of the invention illustrated in FIGURES 1 through 5 is made up of a unit type propellant grain 11 of predetermined uniform burning characteristics and a length and diameter to power the power plant for a predetermined desired period of time; a housing segment 12 dimensioned and shaped to provide an annular combustion chamber section 13 and a venturi shaped exhaust nozzle 14 similar to a typical solid propellant rocket engine combustion chamber and nozzle assembly except that its length is greatly shortened and the conventional forward end wall is entirely omitted; and a propellant feed mechanism 15 including skeleton-like thrust and guide struts 16 of generally channel shaped cross section. As clearly shown in FIGURE 1, nozzle 14 is disposed at one end of combustion chamber section 13, namely, the rear end, and the opposite or forward combustion chamber skirt end 17 is provided at a point inwardly thereof with annularly spaced, inwardly directed stop lugs or pins 18, preferably three in number adapted to abuttingly contact the rear burnable end of propellant grain 11. A slight distance further inwardly from the forward combustion chamber end there is a bearing support comprising a series, preferably three, spider arms 19 the outer ends of which are welded to the inner wall of housing segment 12 and the inner ends of which mount a sleeve-like hub 21. Hub 21 forms a journal support for the aft end of a shaft 22 which extends forwardly freely through a passage 23 extending from end to end of propellant grain 11. Shaft 22 protrudes beyond the forward end of propellant grain 11 and is externally threaded as indicated at 24 throughout the major portion of its length leaving plain journal portions 25 and 26 at its opposite ends. Stop pins 18, spider arms 19, hub 21 and shaft 22 as well as housing segment 12 are formed of heat resistant metal suitable for withstanding both the heat and pressures developed in the combustion chamber during operation of the engine.

Journal portion 26 of shaft 22 is journalled in an end thrust socket 27 in the form of a hub carried by spider arms 28 mounted on the forward ends 29 of combined thrust and guide struts 16 in any suitable manner for example by means of an annular ring 30 welded to the ends 29 of struts 16 as clearly shown in FIGURE 5. Inwardly from the journal portion 26 of shaft 22, the shaft is provided with a suitable gear 31 fixed to shaft 22 by a key 32 and primarily intended as an auxiliary power take-off element. Shaft 22 is also threadedly engaged with a thickened hub 33 of a follower plate 34 the outer diameter of which is equal to the outer diameter of fuel grain 11. This diameter, as will be clear from FIGURES 3 and 4 of the drawings, is sufficiently less than the diameter of the circle defined by the inner free ends of the divergent walls 35 of channel shaped struts 16 to assure a free sliding engagement between the periphery of fuel grain 11 and the free ends of walls 35. Follower plate 34 at points directly opposite the channel openings defined by walls 35 of struts 16 is provided with anti-rotation pins or lugs 36 dimensioned to freely pass axially along thrust and guide struts 16 during operation of the engine.

The journal portion 25 of shaft 22 preferably protrudes rearwardly from journal hub 21 and is provided with a reduced diameter end 37 adapted to fixedly mount the hub 38 of a suitably formed heat resistant bladed fan member 39 the blades 41 of which are shaped in any well known manner to adapt fan member 39 to serve as a shaft drive element under influence of the rearward mass flow of combustion gases resulting from the end burning of propellant grain 11. While the preferred form of the invention contemplates that fan member 39 serve as the propellant grain feeding drive member, and that blades 41 be disposed to rotate fan member 39 and shaft 22 in a direction to advance propellant grain 11 rearwardly against stops 18 at all times as the grain end is consumed in the burning of the propellant, it is to be understood that fan member 39 may be omitted if desired, in which event gear 31 may be driven from any desired auxiliary drive source to advance propellant grain 11 against stops 18. Since propellant grain 11 in either case forms the forward end wall of combustion chamber section 13 and, therefore, must sealingly cooperate with the skirt end 17 of housing segment 12 and the rearward end of shaft 22, suitable annular seals 42 and 43 are respectively disposed between the propellant grain and skirted end 17 and the propellant grain and shaft 22. These seals may take any desired form so long as they have a sliding engagement with the propellant grain and are respectively positively fixed to the skirted end 17 of housing segment 12 and the periphery of shaft 22.

The operation of the preferred form of engine shown in FIGURES 1 through 5 will, it is believed, be clear to those skilled in the art. Suffice it to say that the rearward end of propellant grain 11 is initially positioned with its ignition end surface against stop pins 18 and ignited in any suitable way by any typical and conventional type solid propellant igniter. Once lit, the combustion gases rapidly build up to the predetermined designed pressure in combustion chamber section 13 to establish a propulsion flow of gases aft through the venturi shaped exhaust nozzle 14 the escape area of which remains constant for all practical purposes. The reaction pressure forces of these gases acting on the burning end of propellant grain 11 are effective to establish an optimum burning rate in well known manner and are transmitted to and resisted by the unburned propellant grain body, follower plate 34, the forward end 25 of shaft 22, thrust socket 27, spider arms 28 and ring 30. It will be appreciated, therefore, that by proper designing of these various engine parts and the propellant grain itself an engine having definitely predeterminable burning, propulsion and thrust characteristics can be readily produced and that all operational forces can be readily predetermined and full provision can be made in the engine structure itself to withstand all internal operational forces. It will also be appreciated that the rate of advance of the solid propellant grain, whether the feeding of the grain is effected by the mass flow of the combustion gases through fan member 39 or an external source of power acting through gear 31, will be dependent upon the burning rate of the propellant grain so long as fan member 39 or the exterenal power source is designed to secure an advancing feed at least equal to the rate of consumption of the fuel grain. It will further be appreciated that utilization of a controllable or reversible external power source and gear 31 for accomplishing the advancing feed of the grain provides a ready means for stopping operation of the engine at will by either stopping the advancing fuel grain feed or reversing the feed back off follower plate 34 thus permitting the reaction pressure forces of the combustion gases on the fuel grain to move the burning grain end out of skirted end 17 of housing segment 12. This effects stoppage of the engine since burning of the grain without application of an advancing force through gear 31, shaft 22 and follower plate 34 will result in an increase in the combustion chamber volume and an incident progressive lowering of the combustion chamber gas pressures to a point below that required to maintain optimum burning of the fuel grain and finally to a point causing "blow out" of the burning fuel when the combustion chamber pressure falls below that necessary to maintain combustion, a condition certain to be reached when the fuel grain burns forward to a point where the burning end lies forwardly of one or both seals 42 and 43 thereby venting the combustion chamber to the ambient atmosphere or when the rotation of the fuel grain feed shaft is reversed permitting the reaction pressure forces to move the fuel grain burning end forwardly out of skirted end 17 of housing segment 12. To assure prompt attainment of this latter purpose, the axial length of the skirted end 17 of housing segment 12 is preferably held to an absolute minimum to secure the quickest possible shut-off of the solid fuel engine.

It will be seen from the foregoing description that the engine of FIGURES 1 through 5 can be incorporated in any structure suitable to be driven by such an engine without the need of designing the driven structure to withstand any of the combustion chamber pressures or internal thrust forces of the engine. As a matter of fact, the vehicle for engines made in accord with this invention need only be designed to withstand and utilize the propulsion forces of the engine through abuttingly contacting the forward face of ring 30 or a forwardly facing portion of the housing segment 12. It follows, therefore, that such an engine is desirably suited for releasable association with a nose type vehicle such as may be used in high altitude rockets artificial satellites and long range missiles where the weight of a spent engine is a detriment and a maximum thrust weight ratio, obtainable by the possible decreased weight of the nose vehicle as well as the engine itself, is desirable. It will also be apparent that such an engine embodies:

(1) The novel concept of moving the solid propellant grain in a manner to maintain its burning surface in the same relative position to the rocket mechanism's combustion chamber and exhaust nozzle throughout the burning period.

(2) The novel concept of utilizing energy from the propellant gases to move the solid propellant grain to maintain its burning surface in the same relative position to the rocket mechanism's combustion chamber and exhaust nozzle throughout the burning period.

(3) The concept of a propellant feed mechanism employing an impeller in the engine's gas stream to move the solid propellant grain to maintain its burning surface in the same relative position to the rocket mechanism's combustion chamber and exhaust nozzle throughout the burning period.

(4) The novel concept of a solid propellant engine designed with a fixed physical relationship between the propellant burning surface and rocket mechanism's combustion chamber and exhaust nozzle.

(5) The novel concept of a solid propellant engine design wherein the propellant grain is not completely enclosed in a pressure vessel which functions as the combustion chamber and the overall engine weight can be held to a minimum.

(6) The novel concept of utilizing energy from a controllable source to move the solid propellant grain to maintain its burning surface in the same relative position to the rocket mechanism's combustion chamber and exhaust nozzle throughout the burning period whereby an effective means is provided to stop the operation of the engine prior to burn-out.

(7) The novel concept of utilizing part of the solid propellant engine's energy to provide auxiliary power.

(8) The novel concept of utilizing energy from a source external to the engine to drive the propellant feed mechanism in order to enable stopping of the engine's operation at any desired time prior to the end of "burn-out."

Referring next to FIGURE 6 of the drawings, a fragment of an engine like that of FIGURES 1 through 5 is illustrated fitted with a modified propellant grain 11a designed to provide an initial maximum thrust force for a predetermined period of operation and a reduced thrust force thereafter. This end is acomplished by providing the propellant grain body 11a with an enlarged coaxial recess 45 extending inwardly from the end opposite its intended ignitable end to a point a predetermined distance from its ignitable end, fitting the recess 45 with an integral non-burnable metal disk or insert 47 threaded on shaft 22 and provided with a peripheral seal 48 adapted to slidingly sealingly engage the annular wall of recess 45 when disk 47 reaches the end of the shaft thread as the surrounding propellant grain body is consumed in use. If desired the end 25 of shaft 22 may be enlarged slightly at the thread end to provide an abutment stop shoulder 49 for disk 47. It will be appreciated that upon initial ignition the full end area of propellant grain 11a will burn producing a maximum predeterminable volume of combustion or propulsion gas during the first stage of combustion and that this maximum volume will be obtained during the time interval required for burning the propellant grain 11a down to the inner end of recess 45. It follows, therefore, that by use of a propellant grain having a known rate of combustion under the pressure conditions that can be accurately forecast for the constant volume combusion chamber provided by this invention it will be a simple matter to predetermine the developed thrust of the engine during this initial time interval and that the duration of the time interval itself can be readily predetermined. It also follows that by calculating the cross-sectional area of recess 45 and knowing the gas emission characteristics of the propellant grain itself, it will be an equally simple matter to predetermine the developed engine thrust during the remaining burning interval of the reduced area propellant grain section. Accordingly, high followed by lower thrust stages of operation of the engine of this invention may be readily predetermined and planned for merely by appropriate design of the propellant grain itself.

Referring next to FIGURES 7, 8 and 9 of the drawings, there is illustrated a structurally different solid propellant engine 10a made in accord with the basic concept of this invention. Engine 10a achieves most of the advantages of the engine 10 of FIGURES 1 through 6 and illustrates a preferred and an exceedingly simple and effective multi-stage propellant grain design adapting engines made in accord with either of the disclosed forms of the present invention for staged operation wherein it is desired to provide varying thrusts in succeeding stages going either from a higher to a lower thrust or a lower to a higher thrust at alternate predetermined time intervals. In this form of the invention, the housing segment 12a like housing segment 12 of the previous form of the invention provides a constant volume combustion chamber 13 and venturi shaped exhaust nozzle 14 of typical design. Like housing segment 12, housing segment 12a is of greatly shortened length compared to the corresponding housing structures of prior solid propellant engines and has a forward skirted combustion chamber end 17a delimiting the end of the combustion chamber opposite nozzle end 14.

In this form of the invention, skirt 17a at a point forwardly from nozzle 14 substantially the same distance as fuel grain stops 18 of the previous embodiment is provided along its interior wall with an annular, inwardly opening groove 51 (FIGURE 9) of generally rectangular configuration in cross section. A second annular, inwardly opening groove 52 of substantially smaller size and of generally rectangular configuration is formed in the interior wall of skirt 17a at a location axially spaced from nozzle 14 at about the same spacing as spider arms 19. These grooves respectively form a feed mechanism positioning groove and an O-ring seal groove in which an O-ring 53 is positioned for sealing engagement with the innermost end of the fuel grain feed mechanism 54 which will now be described.

Referring particularly to FIGURES 7 and 8 of the drawings, feed mechanism 54 is made up of a rotatable feed sleeve member 55 dimensioned externally to sealingly engage with O-ring 53 and having an external annularly protruding flange 56 designed to interfit in groove 51 to fix sleeve member 55 against relative axial movement with respect to housing segment 12a. To permit assembly of flange 56 in groove 51, the inner wall of flange 17a forwardly of groove 51 is preferably internally threaded as indicated at 58 for threaded cooperation either with an optionally usable fuel grain shroud or protective covering 59 (FIGURE 7) of thin light weight metal or other material or a sleeve-like retainer ring 61 (FIGURE 9).

Rotatable feed sleeve member 55 at its inner end is formed with an annular inwardly directed flange 62 which forms a common hub for a multiplicity of short generally radially inwardly directed propulsion or drive vanes or blades 63 equally spaced around the entire inner end of member 55. These drive blades are disposed rearwardly of a series of inwardly directed stop lugs or pins 18 formed on the inner wall of member 55 and serving to locate and position the burning end of the fuel grain 11a of this form of the invention as do the similar stop lugs or pins 18 of the previously described embodiment of the invention. The inner wall of member 55 forwardly of stop pins 18 is formed with a female thread formation 65 adapted to matingly receive a corresponding male thread formation 66 formed along the periphery of the fuel grain 11a.

Bearing in mind that the fuel grain diameter in solid fuel engines of the type here disclosed may be of the order of six to eight feet and the other dimensions are in relative proportions as indicated by the enclosed drawings and that the full combustion chamber pressures will be reacting against the burning end of the fuel grain, it will be appreciated that this thread connection and the retainer flange 56 must have adequate shear strength to resist these forces. To assure such strength, the thread 65 of member 55 preferably takes the form illustrated, a form most closely resembling what is generally known as a "buttress thread." As clearly illustrated in FIGURE 7, propellant grain 11a is made up of a series of integrally joined segments 67, 68, 69, etc. each designed to have respective predetermined burning and gas evolution characteristics to provide differing thrust characteristics. Such grain constructions are within the existing knowledge of the art and aside from their particular cooperation with the novel constant volume combustion chamber provided by this invention form no part of the present invention. Preferably the final propellant grain segment of the engine of FIGURE 7 is backed up by a follower plate similar to plate 34 of the previous embodiment but having a peripheral axially forwardly directed flange (not shown) formed with widely annularly spaced helically disposed anti-rotation lugs engageable with suitable axial grooves in covering 59 or forwardly extending struts carried by skirt 17a. Since the reaction forces developed in the combustion chamber of this form of the invention are directly transmitted through the fuel grain burning end, threads 66 and sleeve threads 65 to skirt 17a through annular flange 56 of sleeve member 55, the follower plate of this modified form of the invention is preferably fixedly secured to the final propellant grain segment to effectively prevent rotation of the propellant grain until its lugs enter sleeve thread 65. At that time, the back up plate will serve to advance the remaining thickness of the fuel grain against stops 18 and to resist the back pressure from the time the propellant grain thickness would not be sufficient until final "burn out."

The only difference between the engine illustrated in FIGURE 9 and that of FIGURES 7 and 8 resides in the construction of the propellant grain itself. In this illustration, propellant grain 11b is formed of a combustion of uniform unit area gas producing characteristics having central recesses of varying diameter respectively axially spaced one from the other and provided with propellant plugs 71 and 72 of respectively lower or higher gas emission characteristics. Such centrally plugged propellant grains will provide staged operation of the character heretofore mentioned as will be obvious to those skilled in the art.

In all forms of the invention, the rocket engine nozzle is of conventional design and is formed integrally with the main body of the combustion chamber to form a minimum length housing assembly needed to be constructed to withstand the operating temperatures and pressures of the combustion zone. Forwardly from the skirts 17 or 17a, the chamber assembly need only be designed to carry the loads imposed by the struts 16 or the flange 56 or detent ring. It is to be understood that it is not necessary to extend the chamber forwardly as illustrated in FIGURE 7 unless it be desired to provide a light protective sheath for the propellant grain as shown.

The rocket engines assembled as shown with the ignition surface against the propellant grain positioning stops when ignited in the conventional manner with a typical igniter, form gases on the burning surface of the propellant grain which flow rearwardly toward the nozzle past the impeller blades in both forms of the invention. The forward end of the combustion chamber in engines made in accord with this invention is sealed by the gas pressure seals 42—43 or 52 and the seal formed by the threads of the propellant feed mechanism acting on the mating thread of the propellant grain. The mass flow of the combustion gases through the impeller blades causes the propellant feed mechanism to rotate the propellant grain and advance the grain toward nozzle 14 to maintain the grain's burning surface in contact with the propellant grain positioning stops. With the constant force of the combustion gases on the impeller, the feed mechanism will positively maintain the burning surface of the propellant grain against the positioning stops during the entire burning period since the follower or end plates in both embodiments disclosed will be effective to support the combustion chamber pressure during the final phase of the burning period. It, accordingly, will be appreciated that the present invention provides exceedingly simple and rugged solid propellant engines the thrust characteristics of which can be accurately predetermined so that by proper propellant grain design an engine having any desired operational characteristic from the time of ignition to final "burn out" can be readily planned. It will also be appreciated that the engines of the present invention assure a propellant-weight ratio assuring maximum efficiency of propulsion of vehicles in which they are to be employed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A solid propellant or fuel engine comprising a pressure resistant housing composed of a combustion chamber section and a discharge nozzle, said combustion chamber section having a short propellant grain support skirt at the end remote from said nozzle directly communicating with said combustion chamber section; an end burning, axially elongated propellant grain peripherally dimensioned to be received within said skirt passage and disposed with its burnable end within said skirt passage, its main body protruding from and extending axially away from said skirt and its burnable end forming a wall of said combustion chamber at the inner end of said skirt passage; angularly spaced, inwardly protruding propellant grain stops formed at the inner end of said skirt passage; propellant grain feed means fixed against axial relative movement with respect to said skirt and drivingly engaging said propellant grain; fluid seal means disposed in said skirt passage and arranged to prevent fluid leakage through said skirt past said one end of said propellant grain; and drive means drivingly connected to said propellant grain feed means and adapted to drive said propellant grain feed means in a direction to continuously advance said propellant grain inwardly through said skirt passage toward said combustion chamber and against said stops throughout the entire burning period of said propellant grain thereby maintaining said propellant grain end face against said stops at all times and the combustion chamber wall formed thereby at the inner end of said skirt passage to assure a constant volume combustion chamber solid propellant engine.

2. The engine of claim 1 wherein said propellant grain comprises a plurality of axially related, preformed segments of differing burning characteristics adapted to supply varying thrust forces of predetermined value whereby a plural stage engine operation having definitely predictable successive thrust characteristics may be provided.

3. The engine of claim 1 wherein said propellant grain feed means comprises an elongated threaded shaft of a length exceeding that of said propellant grain freely received in a centered bore extending axially through said propellant grain, said shaft having its ends extending beyond the respective opposite ends of said propellant grain, a journal spider in said combustion chamber section rotatably supporting one end of said shaft and an axially movable plate member engaging the other end of said propellant grain and having a centered bore threadedly engaging said shaft and a peripherally disposed anti-rotation means adapted to permit relative axial movement of said axially movable plate with respect to said shaft, said thrust absorbing means and said housing; said thrust absorbing means comprises an annular plate member having a centered thrust bearing socket mounting a shaft bearing journalling the other shaft end and annularly spaced struts engaging said anti-rotation means and interconnecting said combustion chamber skirt and the periphery of said annular plate member; and said drive means comprises a driven member fixed to said shaft and adapted to rotate said shaft in a direction to bodily advance said axially movable plate and said propellant grain toward said combustion chamber and said propellant grain stops.

4. The engine of claim 3 wherein said drive means comprises a vaned member fixed to said one end of said shaft within the path of fluid flow through said combustion chamber whereby the advancing feed of said propellant grain is effected in a predeterminable ratio to the burning rate of said propellant grain.

5. The engine of claim 4 wherein said shaft adjacent said other shaft end has a gear member fixed thereto adapted to serve as a power take-off member for furnishing power to drive auxiliary engine equipment or other equipment required by the vehicle powered by said engine.

6. The engine of claim 3 wherein said drive means comprises a gear member fixed adjacent said other shaft end and adapted to be driven by an independent controllable power source carried by the vehicle to be powered by said engine whereby the rate of advancement of said propellant grain may be arrested at will by interrupting the advancing feed movement of the independent controllable power source and causing a forced "burn out" when said one end of said propellant grain burns back beyond said fluid seal means.

7. The engine of claim 1 wherein said propellant grain feed means comprises a sleeve member interposed between said skirt and the periphery of said burnable propellant grain end and having an external annular formation rotatably engaged with said skirt and an internal spiral thread; said skirt has a mating internal annular formation cooperating with said external annular formation to prevent relative axial movement of said sleeve member and said housing; the periphery of said propellant grain has a mating external thread cooperating with said internal thread of said sleeve member; and said drive means comprises vanes fixed to the end of said sleeve member located at the inner end of said skirt passage and arranged to lie in the path of fluid flow through said combustion chamber and rotate said sleeve member in a direction to bodily advance said propellant grain toward said combustion chamber and said propellant grain stops.

8. A solid propellant engine comprising an elongated propellant grain of predetermined burning characteristics and of a predetermined length and cross sectional area; a segmental pressure resistant housing providing a discharge nozzle at one end, a combustion chamber section of predetermined length immediately adjacent to and freely communicating with said discharge nozzle and an open end immediately adjacent to and freely communicating with said combustion chamber and defined by an annular skirt, said skirt being dimensioned and adapted to sealingly receive and encompass the peripheral wall of said elongated propellant grain and being telescopically associated with one end of said propellant grain; stop projections disposed at the inner end of the passage defined by said skirt and engaged by the end face of the telescoped propellant grain end to position said propellant grain end face to serve as a combustion chamber wall; and propellant feed means supported by said segmental housing and drivingly engaging a portion of said propellant grain anterior to said engaged end face, said propellant feed means upon ignition of said engaged end face being adapted to constantly advance said propellant grain inwardly through said open housing end to maintain said ignited, burning end face against said stop projections thereby assuring a combustion chamber having the predetermined constant volume originally designed throughout the entire life of the propellant grain.

9. The engine of claim 8 wherein the propellant feed means comprises an annular sleeve rotatably secured to said skirt and threadedly engaged with the periphery of said propellant grain and propeller blades fixed to said sleeve at its combustion chamber end and lying in the flow path of the combustion gases passing from said ignited propellant grain end to said nozzle to be driven thereby and in turn rotate said sleeve in a direction to advance said propellant grain.

10. The engine of claim 8 wherein the propellant feed means comprises a coaxial threaded shaft, a follower plate threaded on said shaft inwardly from one end and abuttingly engaging said other end of said propellant grain, a thrust ring structure journalling said one shaft end and carried by thrust resisting struts fixed at one end to said segmental housing and extending therefrom in axially directed peripherally spaced relation to said elongated propellant grain and shaft rotating means; and said propellant grain is formed with a centered bore extending from end to end and freely but sealingly receiving said shaft.

11. The engine of claim 10 wherein said shaft rotating means comprises a gear wheel non-rotatably fixed to said shaft between said follower plate and said thrust ring structure in position to be driven by any suitable auxiliary power source and in turn rotate said shaft in a direction to advance said propellant grain.

12. The engine of claim 10 wherein said shaft end opposite said one end extends beyond said ignited propellant grain end into said combustion chamber section and said shaft rotating means comprises propeller blades fixed to said opposite shaft end and lying in the flow path of the combustion gases passing from said ignited propellant grain end to said nozzle to be driven thereby and in turn rotate said shaft in a direction to advance said propellant grain and said gear wheel serves as a power take-off for driving auxiliary equipment.

13. The engine of claim 10 wherein said shaft rotating means comprises a gear member fixed adjacent said one shaft end and adapted to be driven by an independent controllable power source carried by the vehicle to be powered by said engine whereby the rate of advancement of said propellant grain may be arrested at will by interrupting the advancing feed movement of the independent controllable power source and causing a forced "burn out" when said ignited end of said propellant grain burns back beyond said skirt.

14. The engine of claim 8 wherein said propellant grain feed means comprises a sleeve member interposed between said skirt and the periphery of said propellant grain adjacent said ignited end and having an external annular formation rotatably engaged with said skirt and an internal spiral thread; said skirt has a mating internal annular formation cooperating with said external annular formation to prevent relative axial movement of said sleeve member and said housing; the periphery of said propellant grain has a mating external thread extending from end to end and cooperating with said internal thread of said sleeve member; and said drive means comprises vanes fixed to the end of said sleeve member located at the inner end of said skirt passage and arranged to lie in the path of fluid flow through said combustion chamber to be driven thereby and in turn rotate said sleeve member in a direction to advance said propellant grain toward said combustion chamber and said propellant grain stop projections.

References Cited in the file of this patent

UNITED STATES PATENTS

| | | |
|---|---|---|
| 2,600,678 | O'Neill | June 17, 1952 |
| 2,703,960 | Prentiss | Mar. 15, 1955 |
| 2,733,568 | Dickerson | Feb. 7, 1956 |
| 2,748,702 | Sawyer | June 5, 1956 |

FOREIGN PATENTS

| | | |
|---|---|---|
| 1,008,926 | France | Feb. 27, 1952 |